(12) United States Patent
Hilgendorff et al.

(10) Patent No.: US 6,258,270 B1
(45) Date of Patent: Jul. 10, 2001

(54) FILTRATION APPARATUS HAVING CHANNELED FLOW GUIDE ELEMENTS

(75) Inventors: Walter Hilgendorff, Tespe; Gerhard Kahn, Geestacht; Frauke Jordt, Mölln, all of (DE)

(73) Assignee: GKSS-Forschungszentrum Geesthacht GmbH, Geesthacht (DE)

( * ) Notice: Subject to any disclaimer, the term of this patent is extended or adjusted under 35 U.S.C. 154(b) by 0 days.

(21) Appl. No.: 09/149,603

(22) Filed: Sep. 8, 1998

Related U.S. Application Data

(63) Continuation-in-part of application No. PCT/DE98/00006, filed on Jan. 5, 1998.

(30) Foreign Application Priority Data

Jan. 7, 1997 (DE) .............................................. 197 00 231

(51) Int. Cl.⁷ ................................................... B01D 63/08
(52) U.S. Cl. ................................. 210/321.75; 210/323.1; 210/456; 96/7
(58) Field of Search ..................................... 210/229, 231, 210/321.75, 321.84, 456, 498, 321.6, 346, 347, 343, 492, 322, 323.1, 433.1; 96/7

(56) References Cited

U.S. PATENT DOCUMENTS

| 3,872,015 | * | 3/1975 | Madsen ................................. 210/346 |
| 4,613,436 | * | 9/1986 | Wight et al. . |
| 4,695,380 | * | 9/1987 | Hilgendorff et al. ................. 210/347 |
| 5,069,789 | * | 12/1991 | Mohn et al. ..................... 210/321.84 |
| 5,106,506 | * | 4/1992 | Schmidt et al. ................ 210/321.84 |
| 5,232,589 | * | 8/1993 | Kopf . |

FOREIGN PATENT DOCUMENTS

681861 * 4/1995 (EP) .

* cited by examiner

*Primary Examiner*—Ana Fortuna
*Assistant Examiner*—Richard W. Ward
(74) *Attorney, Agent, or Firm*—Klaus J. Bach

(57) ABSTRACT

In a device for filtering and separating fluids, a plurality of disc-like spaced flow guide elements are disposed in a stack in spaced relationship with filter elements disposed in the spaces between the flow guide elements to which fluid can be supplied through inlet openings to flow over the surfaces of the filter elements. Each flow guide element defines at one end a flow opening for the passage of fluid and at least one channel formed in the flow guide element so as to extend adjacent the opening in a direction transverse to the flow of the fluid from the opening into the space between the flow guide elements to promote fluid flow distribution over the width of the flow path through the device.

16 Claims, 6 Drawing Sheets

FILTRATION APPARATUS HAVING CHANNELED FLOW GUIDE ELEMENTS

This is a continuation-in-part application of international application PCT/DE98/00006 filed Jan. 5, 1998, and claiming the priority of German application 197 00 231.5 filed Jan. 7, 1997.

BACKGROUND OF THE INVENTION

The invention relates to a device for filtering and separating fluids by pervaporation, microfiltration, ultrafiltration and reverse osmoses comprising a structure with an inlet opening for receiving the fluid to be separated and discharge openings for discharging the retentate and the permeate and including a plurality of disc-like spaced guide elements for guiding the fluid and a pocket-like filter element disposed between two adjacent guide elements and being exposed on both sides to the fluid flowing through the housing. The guide elements having passages formed at least at the edge areas thereof permitting passage of the fluid.

Such an apparatus is known from DE PS 39 15 197. Here, guide elements are used which have passages formed at opposite sides thereof to permit the fluid to be separated to pass or guide elements which have passages formed only at one side thereof. With this apparatus, a meander-like flow path can be established by the selective use of the guide elements with flow passages only at the apparatus ends or a parallel flow pattern can be established if the guide elements have the flow passages disposed all at the same end wherein the filter elements are disposed between the guide elements. In one case, the flow passages along the filter elements are arranged in series. In the other case, the flow passages are arranged in parallel-depending on the desired application.

The permeate passing into the filter element which has the form of a pocket membrane is discharged by way of a central opening formed in the filter element and is conducted out of the housing.

Pocket membranes are also called membrane pillows or pillow membranes; these expressions are synonymous.

In apparatus which utilize flat filter elements as in the present apparatus, it was found that zones are formed on the surface of the filter element which have different material transfer coefficients. This is caused by different flow conditions which are generated by particular design features of the apparatus. The main reason herefor is that, in order to obtain high pressure resistance and also for economical manufacturing reasons, such apparatus are generally circular and consequently the filter elements are also circular.

It has been observed that, in areas of the filter element with such structures with small material transfer coefficients expressed in Re (Reynolds) numbers, there is a small permeate flow in the areas with high Re numbers. The permeate flow does not increase at the same rate since, in these areas, the permeate flow approaches a limit value asymptotically. Basically, with the same entrance conditions for the medium to be separated in such an apparatus, for example, with regard to the fluid flow, the pressure, the temperature and the type of fluid, there should be the same Re number over the whole surface area of the filter element and, overall, there should be a higher permeate flow. It is noted however that the pressure loss increases exponentially in the areas with the increased Re numbers without resulting in an essentially increased permeate flow. The increased pressure loss particularly in the end areas of such an apparatus results in a reduced operating pressure and consequently in a reduction of the permeate flow.

Basically, this applies also to an apparatus as it is known from DE 37 15 183, wherein the fluid to be separated by the filter element which is enclosed between two flow guide members passes through the filter element from without to within and, in the subsequent filter element, from within to without and in the same way through the following filter elements.

It is the object of the present invention to provide a device for filtering and separating fluids wherein the fluid to be separated can flow over the whole effective area of the filter element with the same speed so that, with a constant flow channel width, also a uniform Re number is obtained for the total effective area of the filter element which provides for a uniform material transfer. Still zones in the area of the surfaces of the filter elements wherein high concentration of the material in the fluid could develop should not occur if the apparatus is operated according to the method of pervaporation which should be basically possible. The transport of large amounts of heat with the fluids to be separated to the location of separation within the apparatus should be possible so that a large temperature drop can be achieved over a short process distance. Also, the apparatus should be easy to manufacture and inexpensive to supply so that it can be used also for relatively low volume applications.

SUMMARY OF THE INVENTION

In a device for filtering and separating fluids wherein a plurality of disc-like spaced flow guide elements are disposed in a stack in spaced relationship with filter elements disposed in the spaces between the flow guide elements to which fluid can be supplied through inlet openings to flow over the surfaces of the filter elements, each flow guide element has at least at one end a flow opening for the passage of fluid and at least one channel formed in the flow guide element so as to extend adjacent the opening in a direction transverse to the flow of the fluid from the opening into the space between the flow guide members to promote fluid flow distribution over the width of the flow path through the device.

With this arrangement, that is, by providing a channel extending transverse to the inlet and/or outlet passage, the fluid entering the apparatus in which the filter element is disposed is uniformly distributed in a simple and effective way over the full width of the filter element and flows uniformly over the whole available filter surface. Tests have shown that, with this simple measure, a uniform flow speed of the fluid over all the filter element surfaces can be achieved and, with constant Re numbers, a uniform material transfer is obtained. The channel or channels insure that the fluid to be separated is distributed over the whole width of the filter element and then flows uniformly over both sides of the filter element.

In a preferred embodiment of the invention, the inlet or outlet flow passage is formed by a plane defined by the end edges of the guide elements, that is, the flow passages is formed in the area of the flow guide elements which would normally be the least effective filter area of a filter element. The same is true for an arrangement where two oppositely arranged flow passages are provided, that is, if guide elements are utilized which permit simultaneous operation of a plurality of chambers which are formed in this manner and which include the filter elements over which the fluid to be separated flows.

The channel or channels are in this embodiment essentially parallel to the plane defined by the end edges of the guide elements whereby the uniform distribution of the fluid to both sides of the filter elements disposed between the guide elements is achieved. In order to provide for relatively large entrance areas to the separation chambers formed between adjacent guide elements, it is advantageous if the cutoff areas of the normally circular filter elements extend over a section of >60° with respect to the center points of the flow guide members. In this way, a uniform flow of the fluid in the entrance and discharge areas and a constant flow speed in the separating chambers can be achieved.

For an even more uniform distribution over the surface of the filter element of the fluid to be separated, a fluid-permeable intermediate element consisting for example of a fabric may be disposed between the filter elements and the guide elements.

Preferably, the guide elements includes a plurality of projections extending from its surface. The projections may have different shapes and serve to guide the fluid flowing over the surface of the guide element or respective the membrane element.

In a particularly advantageous embodiment of the invention, the projections extend essentially at an angle of 45° with respect to the flow direction of the fluid over the surface of the guide element and the length of the projections are so selected that flow passages remain therebetween through which the fluid flowing through the chamber between two guide elements is guided from the inlet passage to the outlet passage.

In another advantageous embodiment, the projections extend semi-circularly-with respect to the center of the guide elements-from the inlet passage to the outlet passage or from one end of a guide element to the opposite end and to the flow openings of the adjacent guide element at the opposite end. With this arrangement, the turbulence and accordingly the pressure losses in the fluid to be separated when flowing past the guide elements and the filter elements are lower than with the arrangement described before such that such an arrangement is particularly suitable for use with highly viscous fluids or fluids including large amounts of solids.

In any case, the height of the projection should be so selected that the filter element disposed between two guide members is not contacted by the projections, that is, that a gap remains between the filter element and the projections such that they cannot engage the surface of the filter element and cover the surface portions of the filter element. The height of the projections may also be so selected that a gap remains also if an intermediate element is disposed between the guide element and the filter element so that even in this case, the whole filter surface remains exposed to the fluid to be separated.

Preferably, the outer edge of the guide element has an axial thickness so that two guide elements abutting at the outer edge provide between the guide elements sufficient space such that a filter element can be disposed therein without coming into contact with the guide elements. As a result, the filter element is supported only in the center permeate discharge opening so that it is free to expand and contract during temperature changes.

In order to avoid the need for a housing receiving the assembled guide elements and filter elements in a pressure tight manner, and it is common in conventional designs, that the guide elements include, adjacent their outer circumferences, circular grooves for receiving sealing elements, preferably O-rings so that the guide elements can be stacked on top of one another in sealed relationship. A housing is therefore not necessary so that the arrangement can be manufactured and provided in an inexpensive manner.

In order to prevent a displacement of the filter elements during assembly and, if present, of the intermediate fluid permeable elements relative to the guide elements, the guide elements is preferably provided with a plurality of projections adapted to engage and center the filter elements and/or the intermediate elements. These projections may also be provided to generate a resistance for the fluid to be separated for reducing the flow speed of the fluid and the formation of deposits from the fluid to be separated.

For the manufacture of the guide elements, any material is suitable as long as it is compatible with the fluid to be separated. Since it is the object of the invention to provide a device which is also inexpensive with regard to the components of which it is made including the guide element, it is advantageous to use a plastic material which can be injection molded. However, other materials such as metals can be used for the manufacture of the guide elements.

Below the invention will be described in greater detail on the basis of the accompanying drawings.

BRIEF DESCRIPTIONS OF THE DRAWINGS

Figure 4:
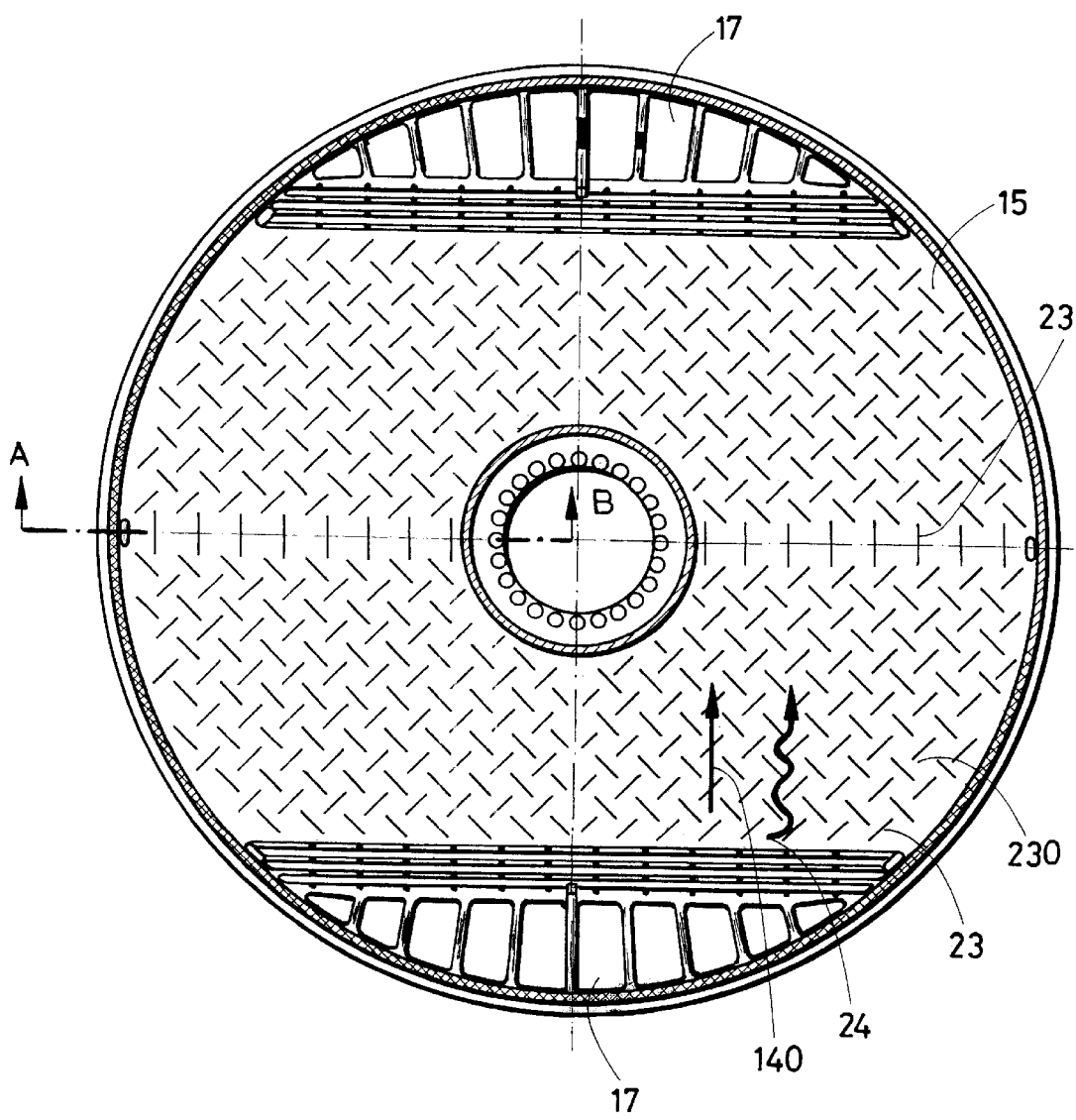
FIG. 4 is a top view of a flow guide element having second types of projections disposed in the surface or surfaces of the flow guide element for guiding the fluid flow thereacross.
Figure 5:
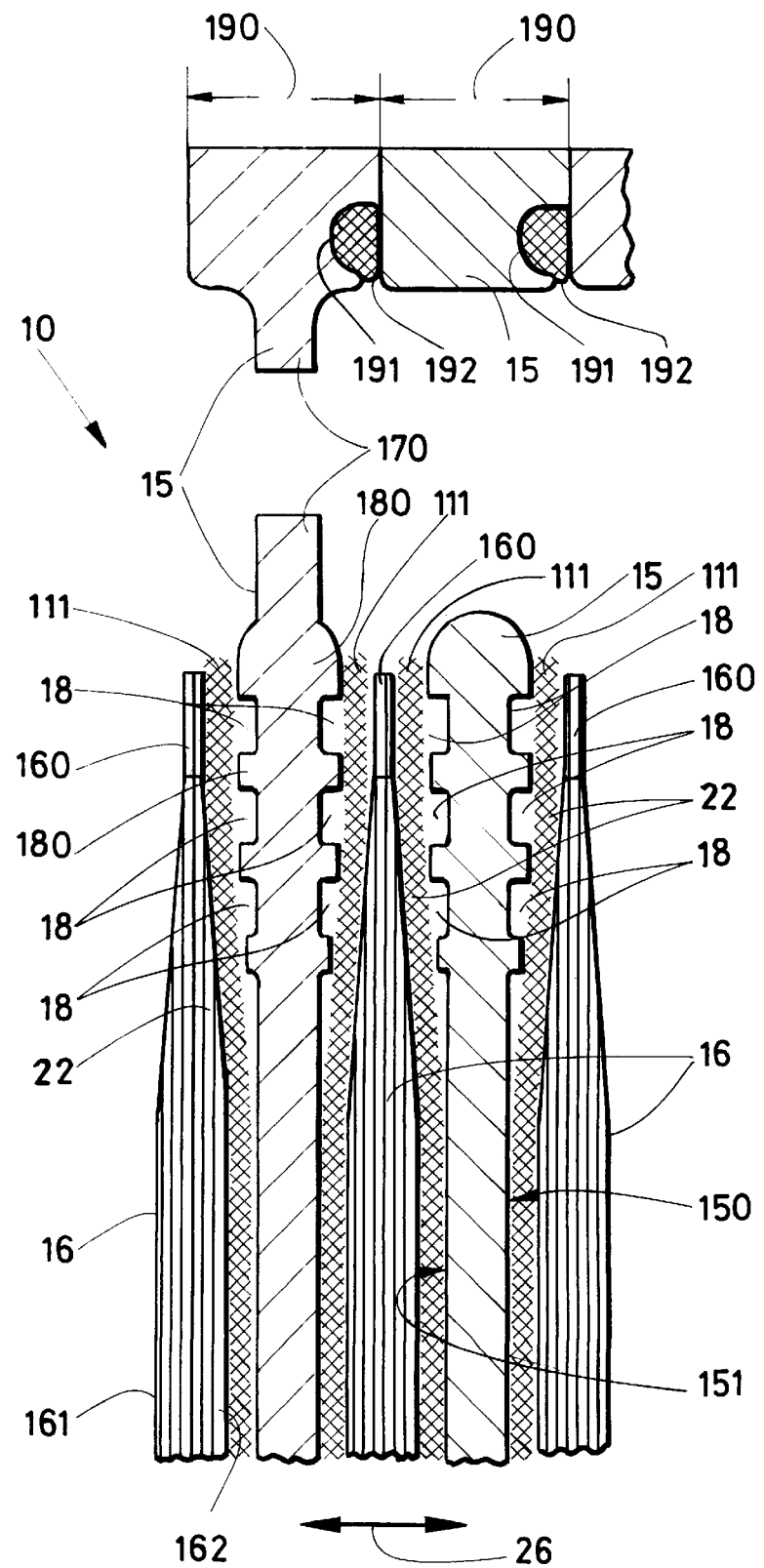
Figure 6:
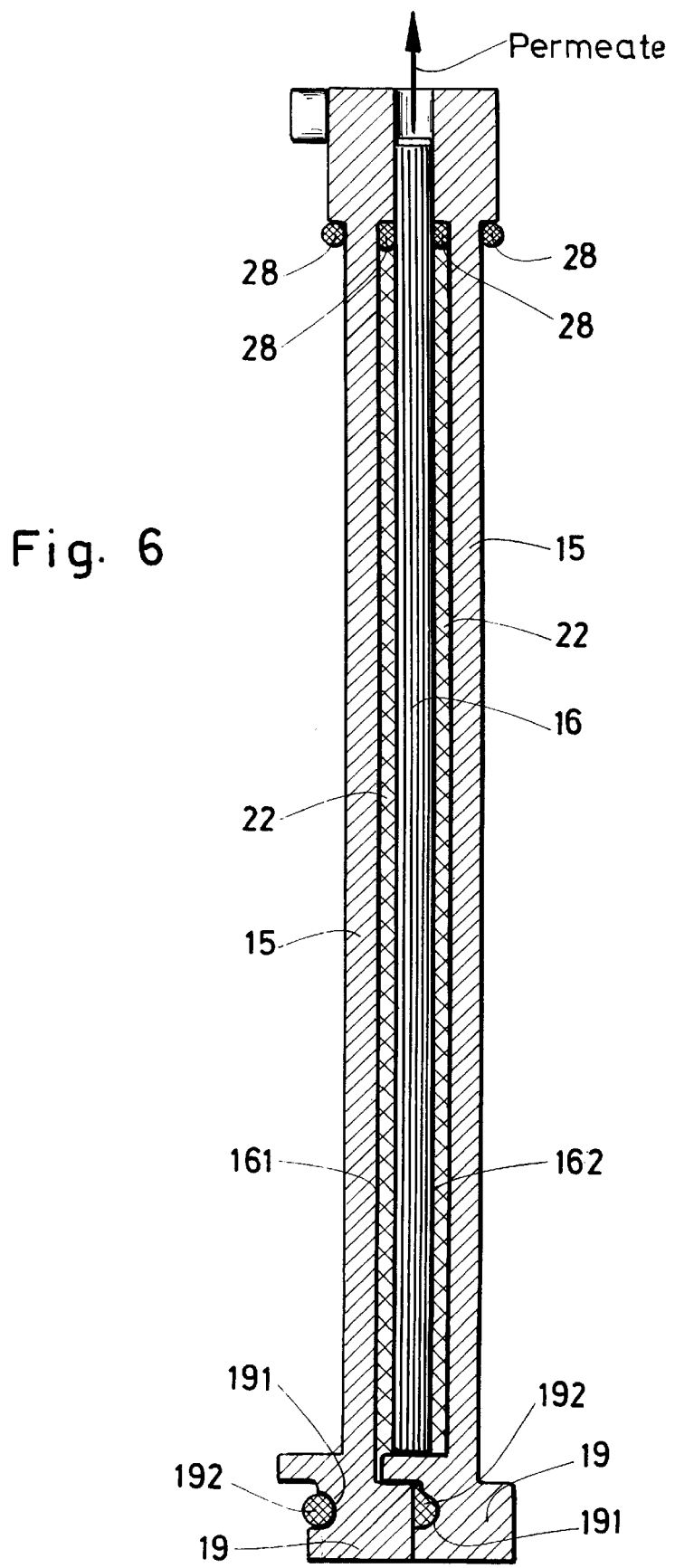

FIG. 5 is a cross-sectional views of a section of a stack of guide elements with filter elements disposed therebetween, and FIG. 6 is a cross-sectional view of a portion of a stack of guide elements with a filter element disposed between adjacent flow guide elements and fluid-pervious intermediate elements disposed between the flow guide and the filter elements, the view being taken along line A-B of FIG. 4.

DESCRIPTION OF PREFERRED EMBODIMENTS

The basic design of the device 10 is well known in the art. It is described therefore below only shortly as far as the total arrangement of the device 10 is concerned. This type of apparatus 10 is used for filtering and separating fluids 14 using the principle of microfiltration, ultrafiltration, reverse osmosis and also pervaporation. The device 10 includes plate-like end flanges 29 provided with an inlet nozzle 31 through which fluid 14 is admitted to the device and an outlet nozzle 32 through which the concentrated or depleted fluid, that is, the retentate, leaves the device. The nozzles 31 and 32 accordingly form the inlet opening 11 for the fluid 14 and the outlet opening 12 for the retentate leaving the device 10.

Figure 1:
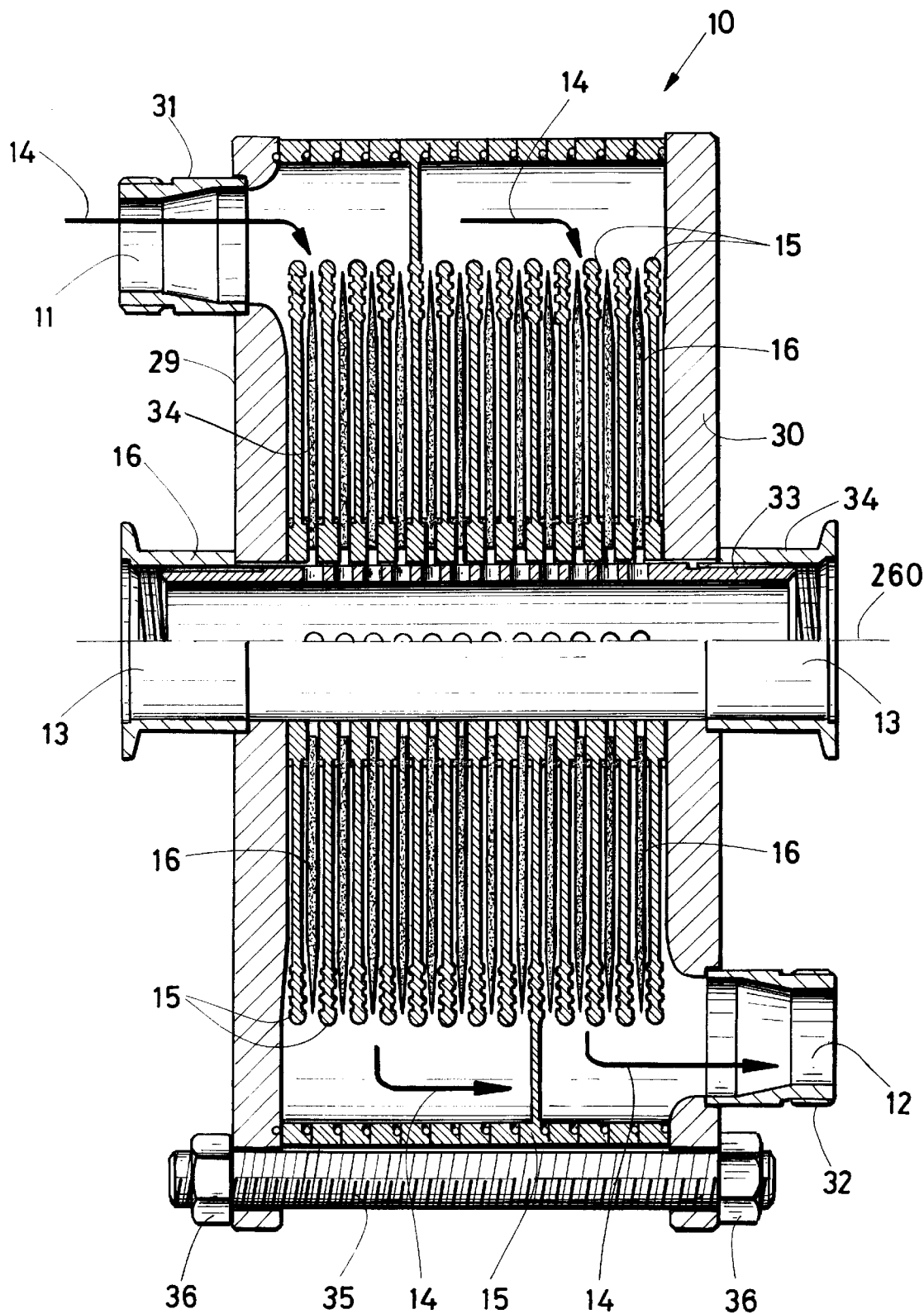
FIG. 1 shows a device according to the invention in cross-section wherein the part shown above the centerline or, respectively, axis of the device including the central connecting bolt is shown cut to show its tubular design permitting the discharge of permeate therethrough. In the lower half, circumferentially arranged connecting bolts are shown for clamping the guide elements together.

Generally, such devices 10 include a permeate discharge tube 33 extending essentially centrally through the device as shown in the embodiment of FIG. 1 above the center line, that is, the device center axis 260. In such an arrangement, the permeate discharge tube 33 may have threaded ends onto which threaded sleeves 34 can be mounted for containing the stack with the end flanges 29, 30 and the guide elements 15 and filter elements 16 and, if present, the intermediate elements 22 in sealing relationship therebetween.

However, the device 10 can be held together as shown for the part below the device axis 260, by bolts 35 which are disposed at the circumference of the device and provided with nuts 36 for compressing the two end flanges 29,30. In this case, the separate permeate discharge tube 33 can be omitted and the permeate discharge tube 33 and the sleeves 34, without threat, are mounted to the end flanges 29, 30 in any suitable fashion.

FIG. 1 further shows a typical design for a stack of guide elements 15, filter elements 16 and intermediate elements 22 which are omitted in FIG. 1 for a better understanding of the arrangement of such devices 10. The arrangement as shown in FIG. 1 should be considered to be only exemplary, that is, depending on the application, the stack may include more guide elements 16 and intermediate element 22; but it may also include fewer of the elements than shown in FIG. 1.

Figure 2:
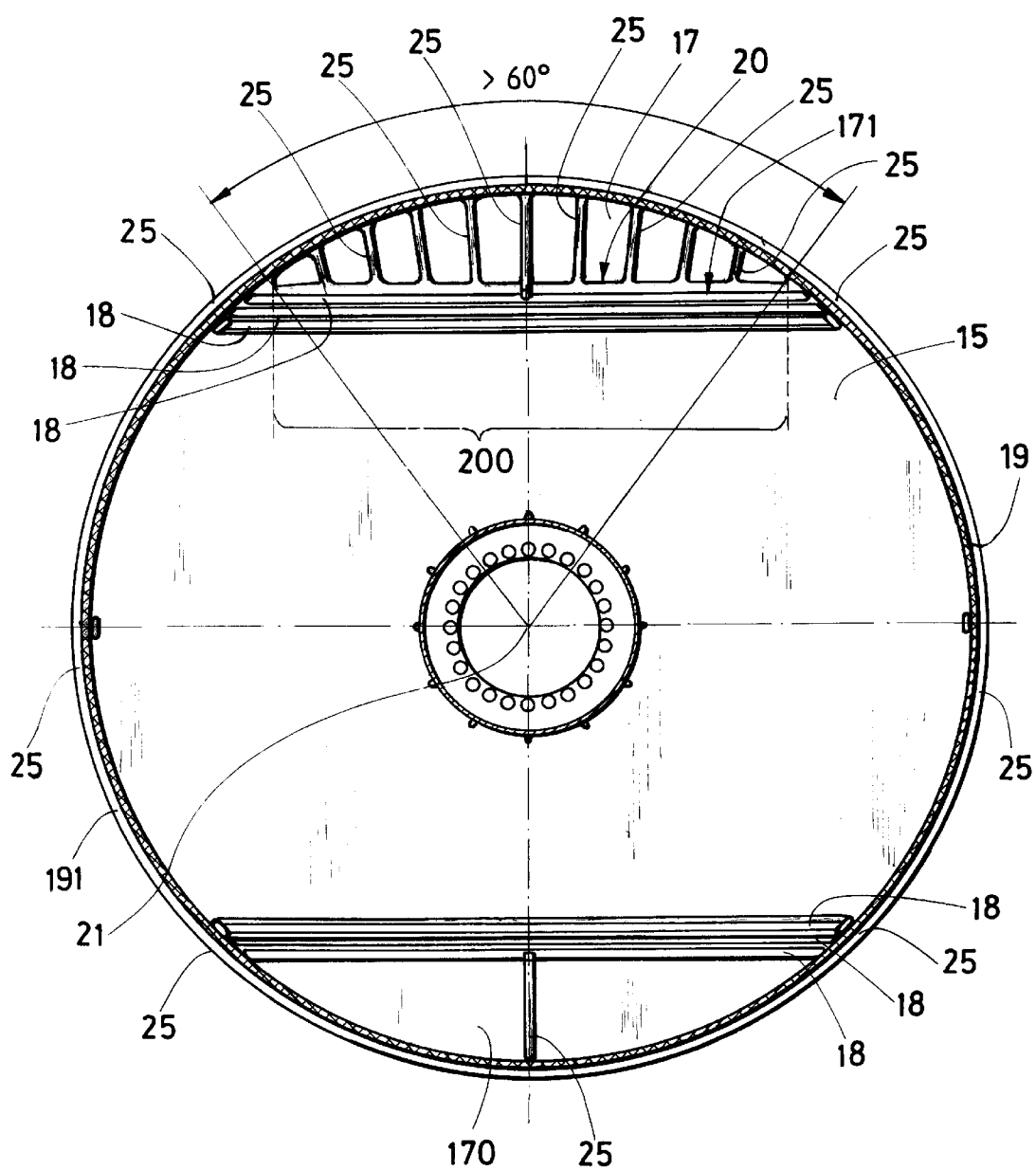
FIG. 2 is a top view of a flow guide element with only one opening for the passage of the fluid to be separated as it is used for a series flow arrangement for the fluid.

Referring now first to FIGS. 2 and 5, FIG. 2 shows a guide element 15 of a typical design. The guide element shown in FIG. 2 includes, in contrast to those shown in FIGS. 3 and 4, only one flow opening structure 17 which is defined between the outer circumferential edge 19 and a plane 20 extending normal to the guide element 15 and between the circumferential edge 19. The flow guide element 15 includes a plurality of channels 18 extending parallel to the plane 20 and being formed by webs 180 whose heights with respect to the surfaces 150, 151 of the guide element 15 become less with increasing distance from the circumferential edge 19 toward the axis 260 of the device 10. Although in the embodiments of the flow guide element 15 shown in the figures, only three such channels 18 are shown, the number may be different for different designs of the flow guide element 15 so that the number of channels shown herein should be considered to be exemplary only.

The flow opening structure 17 includes a plurality of webs 25 which extend between the plane 20 and the circumferential edge 19. The cross-sectional profile of the webs 25 may vary, that is, the center web 25 may be thicker than the shorter webs toward the opposite ends of the flow opening structure 17. In this area, a transverse flow may occur for better fluid flow distribution. The width of the opening structure 17 is determined by the length 200 of the chord defined by the plane 20 between the circumferential edge 19. The chord extends over an angle of >60° with respect to the center point 21 of the flow guide element 15.

Figure 3:
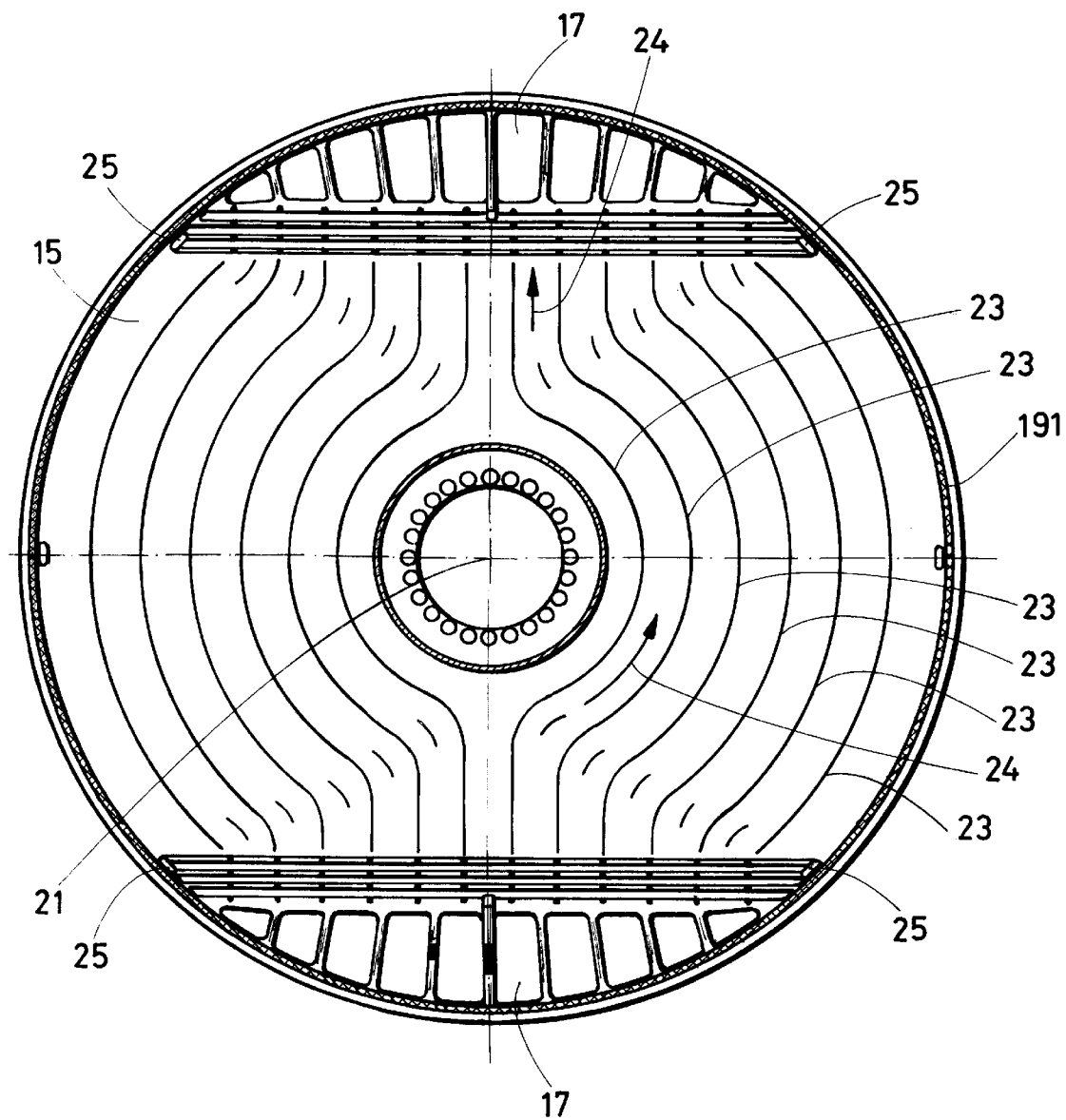
FIG. 3 is a top view of a flow guide element having first types of projections which are disposed on the surface or surfaces of the flow guide element for guiding the fluid flow thereacross.

The FIGS. 3 and 4 show different embodiments of the flow guide element 15 concerning the provision of projections 23 on the two side surfaces 150, 151 or at least one of the surfaces 150, 151. In the embodiment shown in FIG. 3, the projection 23 on the flow guide element 15 extend essentially in a semicircular array with respect to the center point 21 of the flow guide element 15. The projections extend essentially from one flow opening structure 17 to the opposite opening structure 17 so that flow passages 24 for the fluid are formed between the projections. In the embodiment of the flow guide element 15 as shown in FIG. 4, the projections 23 are arranged essentially at an angle of 45° with respect to the general flow direction 140 of the fluid 14 flowing over the surface 150, 151 of the flow guide element 15. The projections 23 have here such a length 230 that they are not joined but form a fluid flow passage 24 between the projections 23, that is, a labyrinth type flow passage for the fluid flowing from one flow opening structure 17 to the opposite flow opening structure 17. Again the projections 23 should be understood to be exemplary; their lengths and their arrangement may vary in many ways.

FIG. 5 shows, in connection with FIG. 1, a stack of flow guide elements 15, filter elements 16 and intermediate elements 22 disposed between the flow guide elements 15 and the filter elements 16. The intermediate element 22 consists of a material which is pervious to the fluid 14 to be separated, for example, of a fabric or a fleece. The filter elements 16 as such are of a type well known in the art; they are formed by so-called membrane pockets consisting of two outer membrane elements 161, 162 which are sealingly joined by a circumferential weld seam 160. The fluid 14 flows over the membrane elements 161, 162 and its permeating components flow through the membrane elements and are conducted to the center point 21 of the filter element 16 which has the form of a membrane pocket. It leaves the device 10 through the discharge opening 13 of the permeate in a well known manner. The filter elements 16 are, as shown in FIG. 5, narrow at their ends adjacent the flow opening structures 17 and also at the opposite sides adjacent the closed segment 170, so that the entrance area for the fluid entering the space between the flow guide elements 15 is increased.

The height of the projections 23 on the flow guide elements 15 and the thickness of the intermediate elements 22, if provided, are so selected that there is a small gap formed between the flow guide element 15 and the filter element 16 so that the projections 23 do not engage the filter elements 16, that is, the membrane elements 161, 162 whereby the full surface of the filter element 16 remains available for contact with the fluid 14.

The outer edge 19 is relatively thick in axial direction 26, that is, it has a thickness 190 providing for sufficient space between adjacent fluid guide elements 15 so that at least the filter element 16, or the filter element 16 and the intermediate elements 22 can be received therein without contacting the flow guide element. The circumferential edge portion 19 also includes an annular groove 191 for receiving a sealing element 192 which may be an O-ring. With this arrangement, a self-sealed flow guide element stack as it is shown for example in FIG. 1 can be provided in connection with the central permeate discharge tube 33 and the end flanges 29, 30 and also the threaded sleeves 34 or by means of the outer bolts 35 and the respective units 36 in connection with the end flanges 29, 30. At the inner edges sealing elements 28 are disposed between the flow guide elements 15 and the adjacent filter elements 16.

It is pointed out that, in the device 10 according to the invention, flow guide elements 15 with only one flow opening structure 17 as well as flow guide elements 15 with two flow guide opening structures 17 may be provided which are arranged opposite each other. With flow guide element 15 with one opening structure 17, the flow guide elements can be so arranged that the fluid flows through the spaces between the flow guide elements 15 in a series flow pattern through the stack of elements. If flow guide elements 15 with two opening structures are used, the flow of the fluid through the stack of elements will be in a parallel pattern.

What is claimed is:

1. A device for filtering and separating fluids by pervaporation, microfiltration, ultrafiltration, or reverse osmosis comprising:

a housing having an inlet opening for receiving the fluid to be separated, an outlet opening for discharging retentate, and an outlet opening for discharging permeate;

a plurality of disc-like flow guide elements disposed in a stack within said housing, said flow guide elements positioned such that they are spaced apart from each other;

filter elements disposed in the spaces formed between adjacent flow guide elements and having surfaces spaced from said flow guide elements such that fluid admitted to the spaces between adjacent flow guide elements flows over the surfaces of said filter elements;

adjacent flow guide elements forming therebetween at least at one end a flow opening in communication with a flow passage formed between a circumferential outer wall portion of said housing and a chord spanning the ends of said circumferential outer wall portion and defining the beginning of an area of said flow guide elements forming passages for the fluid flowing through the spaces between the flow guide elements;

one or more elongated channels formed in each of said flow guide elements which extend parallel and adjacent to said chord to promote fluid flow distribution over the full width of said filter elements as all of the flow passing through said spaces between the flow guide elements passes over said channels before reaching the vicinity of non-channeled portions of said flow guide elements.

2. A device according to claim 1, wherein said chord has a length so as to span a circumferential outer area of at least 60°0 with respect to the center of said flow guide element.

3. A device according to claim 1, wherein a fluid permeable intermediate elements are disposed between said flow guide elements and said filter elements.

4. A device according to claim 1, wherein a plurality of projections are formed on at least one side surface of said flow guide element.

5. A device according to claim 4, wherein said projections extend on said at least one surface in a direction of about 45° with regard to the general fluid flow direction past said fluid flow guide element, said projections having a longitudinal extension such that spaces remain between the longitudinal ends of the projections extending at an angle of 45° in one direction and the side surfaces of longitudinal projections extending at an angle of 45° in the other direction.

6. A device according to claim 4, wherein said projections are formed on said at least one surface of said flow guide element so as to extend essentially semicircularly around the center of said flow guide element between a flow opening at one end of said flow guide element and another flow opening at the opposite end of said flow guide element.

7. A device according to claim 6, wherein said projections are continuous.

8. A device according to claim 4, wherein straight and semicircular projections are formed on the surface of said flow guide element.

9. A device according to claim 4, wherein said projections have a height so selected that a gap remains between the tops of said projections and the adjacent filter element.

10. A device according to claim 1, wherein at least one web extends through said flow opening between said chord and said circumferential outer area.

11. A device according to claim 1, wherein said flow opening is formed along said chord by a front edge which is wedge shaped.

12. A device according to claim 11, wherein the passages formed between said flow guide and said filter elements have an increasing diameter toward said front edge.

13. A device according to claim 1, wherein said circumferential outer area of said flow guide element includes a rim of such a thickness that at least a filter element can be disposed therein without contacting said flow guide elements.

14. A device according to claim 13, wherein said rim includes an annular groove for receiving a sealing element.

15. A device according to claim 14, wherein said sealing element is an O-ring.

16. A device according to claim 1, wherein said flow guide element consists of an injection moldable plastic material.

* * * * *